D. C. PATTERSON.
CORE FOR HOLLOW WALLS.
APPLICATION FILED FEB. 16, 1920.
1,395,452.
Patented Nov. 1, 1921.
2 SHEETS—SHEET 1.
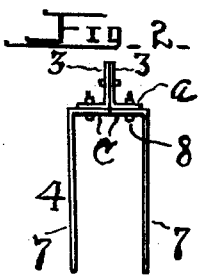
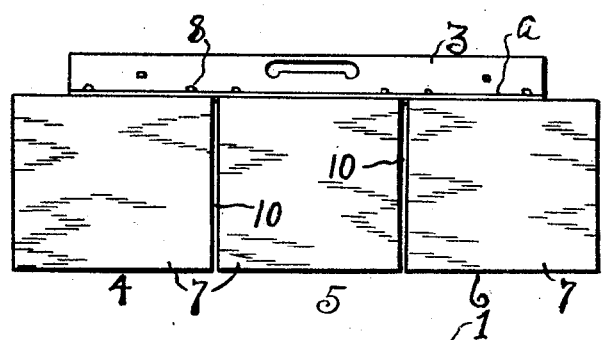
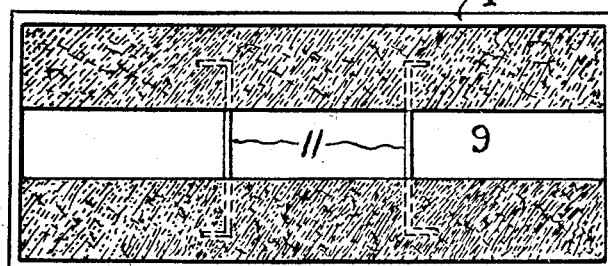
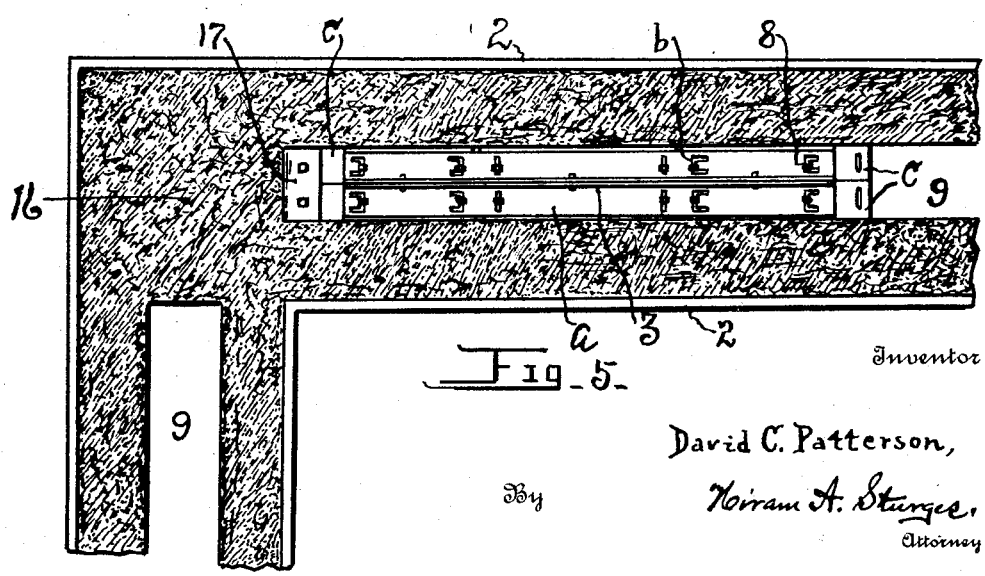
Inventor
David C. Patterson,
By Hiram A. Sturges,
Attorney D. C. PATTERSON.
CORE FOR HOLLOW WALLS.
APPLICATION FILED FEB. 16, 1920.
1,395,452.
Patented Nov. 1, 1921.
2 SHEETS—SHEET 2.
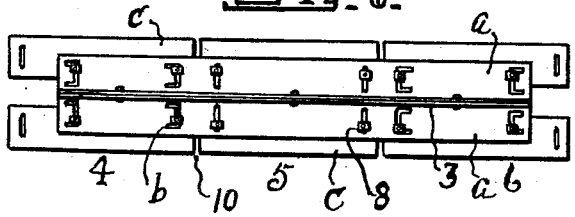
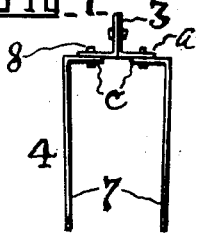
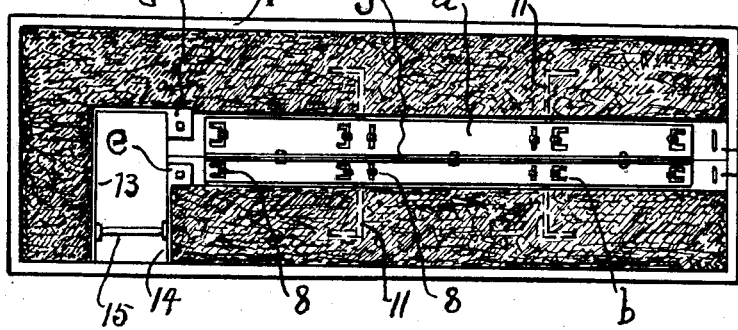
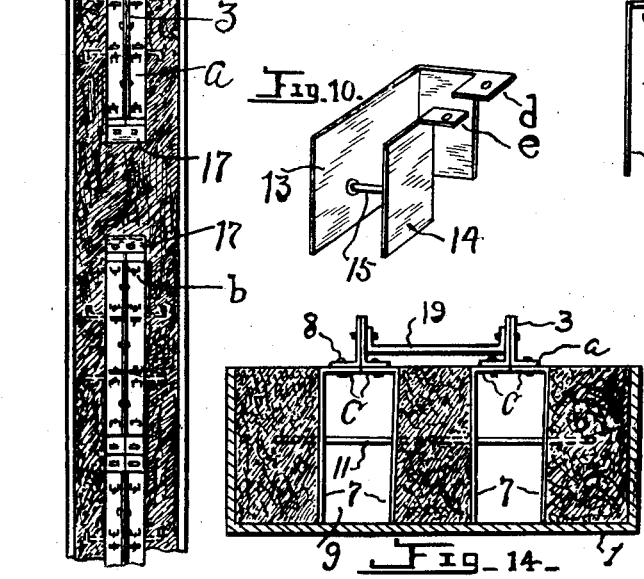
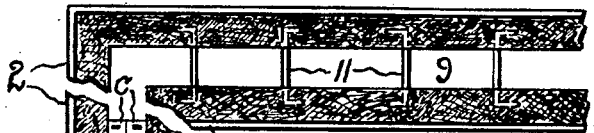
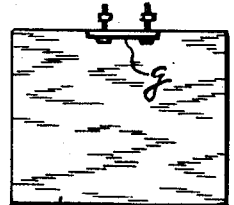
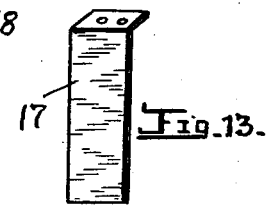
Inventor
David C. Patterson,
By
Hiram A. Sturgel
Attorney

UNITED STATES PATENT OFFICE.

DAVID C. PATTERSON, OF OMAHA, NEBRASKA.

CORE FOR HOLLOW WALLS.

1,395,452.  Specification of Letters Patent.  Patented Nov. 1, 1921.

Application filed February 16, 1920. Serial No. 359,172.

*To all whom it may concern:*

Be it known that I, DAVID C. PATTERSON, a citizen of the United States, residing at Omaha, in the county of Douglas and State of Nebraska, have invented certain new and useful Improvements in Cores for Hollow Walls, of which the following is a specification.

This invention relates to an improvement in cores for use in forming cement or concrete building blocks or in forming building walls, and has for its object to provide a core which will be convenient in use for either of the purposes mentioned, said core to be of such construction that it may be adjusted transversely and longitudinally and will be provided with certain removable appendages useful in forming piers or hollow walls with solid or hollow corners.

With the foregoing objects in view and others to be mentioned hereinafter, the invention presents a novel construction, combination and arrangement of parts, as described herein and claimed and as illustrated in the accompanying drawing, wherein,—

Figure 1 is a plan view of the core, its appendages being removed. Fig. 2 is an end view and Fig. 3 is a side view of the same. Fig. 4 is a plan view of a building block formed by use of the core. Fig. 5 is a plan view showing the device used in forming a wall having solid corners. Fig. 6 is a plan view showing the core when adjusted transversely. Fig. 7 is an end view of the parts shown in Fig. 6. Fig. 8 is a plan view of the device and a molding box, showing arrangement of parts when forming a corner block having an air space. Fig. 9 is a plan view showing the cores used in constructing a building wall having a corner provided with an air space. Fig. 10 is a perspective view showing appendages for the core. Fig. 11 is a side view of an appendage or partition-plate employed for the core and Fig. 12 is an end view of the same. Fig. 13 is a perspective view showing a closure plate for the end of the core. Fig. 14 is a sectional view showing facility of the device in forming walls or blocks having double air spaces.

Referring now particularly to the drawing, the herein described core may be used in connection with molding boxes 1 when forming building blocks, or may be used in connection with upright plates or retaining walls 2 in the formation of hollow building walls, the advantage in the latter instance being that since the concrete or cement, when placed in the wall of a building will require no further labor, said walls may be rapidly, conveniently and economically constructed.

I provide an elongated handle-member preferably consisting of a pair of angle irons or angle-bars 3 suitably secured together, their horizontal flanges $a$ being provided with apertures $b$ of angular form, in plan. Numerals 4, 5 and 6 indicate sections, each consisting of a pair of side plates 7 having horizontal, apertured flanges $c$, said sections being adapted to be disposed end to end below the angle bars, bolts 8 or equivalent keepers being employed and engaging in the apertures of the flanges $c$ and $a$ for securing the sections in stationary relation with the connected angle-bars, and it will be understood that adjustments may be made whereby the side plates 7 of a section may be disposed nearer together or farther from each other to form an air space 9 of lesser or greater width in a wall or wall-block, as may be required; also that adjustments may be made of the sections longitudinally of the angle-bars so that spaces 10 will be provided intermediate the ends of the sections for receiving the anchor-rods or tie-bars 11 when forming a hollow wall or hollow block; and in instances where tie-bars are not required for a wall or block it will be understood that the sections 4, 5 and 6 may be disposed with their ends in engagement.

The sections 4, 5 and 6 and the handle-member may be constructed to advantage of sheet metal, and while I have shown three sections, the number, of course, may be greater or less, the side plates 7, preferably, being disposed convergent toward their lower edges, to permit the core to be drawn upwardly, without undue resistance, from a wall or molding-box, after the cement or other adhesive material has been applied.

In order that an air space may be provided for the corners of a building wall and that corner blocks may be provided with an air space, I provide an appendage for the core, consisting of an L-shaped plate 13 having a flap $d$ adapted to be removably secured to the flange $c$ of one of the sides of a section, to project beyond the end thereof, and provide a rectilinear plate 14 having a flap $e$ adapted to be removably secured to the flange c of the opposite side-plate of the section, said plates 13 and 14 having widths corresponding to the width of the side plates 7. The rectilinear plate 14, when connected with the core, is disposed at right angles to the side plates 7, and said plates 13 and 14, as described, provide an extension approximately of elbow-form for the core, and by use of these parts air-spaces may be provided for the corners of buildings or building blocks.

Numeral 15 indicates a spacing-bar engaging the parallel parts of plates 13 and 14 for resisting stresses directed to these plates by the adhesive material when the latter is deposited in a wall or molding box, found to be useful in some instances.

In order that solid corners 16 may be provided for walls I provide a closure-plate 17 having a length equal to the width of a section and having a flange adapted to be removably secured to the flanges c of the side plates of a section, the width of the plate 17 being approximately equal to the distance apart of the side plates, and adapted to make a closure of the end of a section.

When forming door or window openings in a wall, end-plates 18 are employed having such a width that when its flap g is connected with the flanges c of a section, it will project outwardly beyond the side-plates 7, said width being equal to the thickness of the wall to be formed, and it will be understood that when this plate is mounted as described it will be disposed at the end of and at right-angles to the core, to operate as a molding-plate in forming the terminal of a wall.

In some instances, especially in the erection of buildings having comparatively thick walls, it is desirable to form a double air space, and the herein described core is adapted for use for this purpose, two cores, as shown in Fig. 14 being employed and maintained parallel, side by side, by spacing-bars 19.

It will be understood that the use of the core will be practically the same whether forming building blocks by the employment of molding-boxes 1, or when forming the walls of a building by use of the retaining-plates 2, the cores in the latter instance being disposed midway between the side retaining-plates before the cement is applied, tie-bars being used or dispensed with as may be required, the closure plates 17 being used when forming piers or solid corners, and the appendages 13 and 14 being employed when it is desired to form hollow walls at the corners of a building. It will be appreciated that, by use of the cores, walls may be formed conveniently and with a minimum amount of labor; also on account of the adjustments mentioned, air-spaces may have various widths, and on account of the convergence mentioned for the side-plates 7, the cores may be drawn upwardly from the walls or molding-boxes without undue resistance.

What I claim as my invention and desire to secure by Letters Patent is:—

1. In an adjustable core for the purposes described, an elongated handle-member provided with a pair of horizontal flanges, and a plurality of sections each consisting of a pair of side plates disposed parallel with and mounted on the handle-member to permit them to have transverse and longitudinal adjustments relative to said handle-member.

2. In an adjustable core for the purposes described, the combination of a pair of angle-bars connected back to back each having a horizontal flange provided with apertures, a plurality of sections, each consisting of a pair of side plates having horizontal apertured flanges, said sections being disposed end to end, with their horizontal flanges engaging the horizontal flanges of the connected angle-bars and adapted to be adjusted longitudinally and transversely of said angle-bars, and a plurality of bolts or equivalent keepers in said apertures for maintaining the sections stationary with the angle-bars.

3. In an adjustable core for the purposes described, an elongated handle-member having a pair of opposed apertured horizontal flanges, a plurality of sections each consisting of a pair of side plates projecting below and adapted to engage the horizontal flanges of the handle-member, bolts or equivalent keepers carried by the flanges of the side plates and engaging in the apertures of the horizontal flanges of the handle-member, said apertures being angular in plan to permit the side plates of the sections to be disposed at predetermined distances from each other transversely and longitudinally of the handle-member.

4. In an adjustable core for the purposes described, an elongated handle-member provided with a pair of horizontal flanges, a plurality of sections each consisting of a pair of side plates disposed approximately parallel with, below, and mounted upon the handle-member, means to adjust the sections longitudinally of the handle-member, and a closure-plate removably mounted upon and disposed at one of the ends of a section.

5. In an adjustable core for the purposes described, an elongated handle-member having a pair of horizontal flanges, a plurality of sections each consisting of a pair of side plates projecting below and having horizontal flanges adapted to engage the horizontal flanges of the handle-member, means to adjust the sections longitudinally and transversely of the handle-member, an appendage approximately L-shape in plan, a rectilinear appendage, said appendages having parts disposed at right angles to the sections and having parts detachably secured to one of the ends of a section to provide, in combination with the side-plates, an air space approximately of L-shape.

6. In an adjustable core for the purposes described, an elongated handle-member provided with a pair of horizontal flanges, a pair of side plates disposed approximately parallel with and mounted upon the handle-member, and means to adjust the side plates transversely of said handle-member.

7. In an adjustable core, the combination with a pair of side retaining plates, an elongated handle-member provided with a pair of horizontal flanges, and adapted to be disposed between said side retaining plates, a plurality of sections each consisting of a pair of side plates disposed approximately below, parallel with, and mounted upon the handle-member, means to adjust the sections longitudinally of the handle-member, a plate adapted to be removably mounted upon and to be disposed at one of the ends for closing the area between the side plates of a section, and a second plate adapted to be removably mounted upon and to project transversely of a section for engaging the pair of retaining plates.

8. In an adjustable core for the purposes described, the combination of a pair of angle-bars connected back to back each having a horizontal flange provided with apertures, a plurality of sections, each consisting of a pair of upright side plates provided at their upper longitudinal edges with horizontal apertured flanges and disposed downwardly convergent with reference to each other, said sections being disposed end to end with their horizontal flanges engaging the horizontal flanges of the connected angle-bars and adapted to be adjusted longitudinally and transversely of said angle-bars, and a plurality of bolts or equivalent members in said apertures for maintaining the sections stationary with the angle-bars.

In testimony whereof, I have affixed my signature in presence of two witnesses.

DAVID C. PATTERSON.

Witnesses:
    ARTHUR H. STURGES,
    HIRAM A. STURGES.